Feb. 19, 1952 P. L. KRICHBAUM 2,586,431
FISHHOOK EXTRACTOR
Filed May 26, 1947
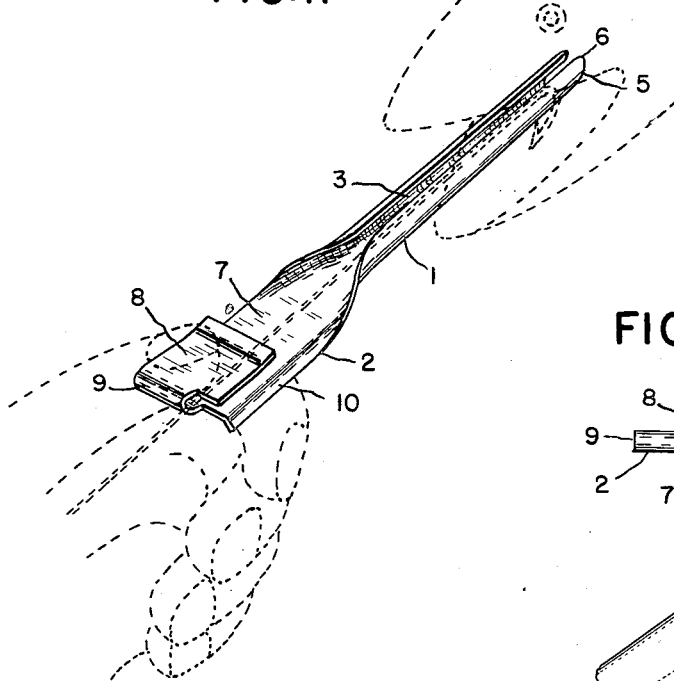
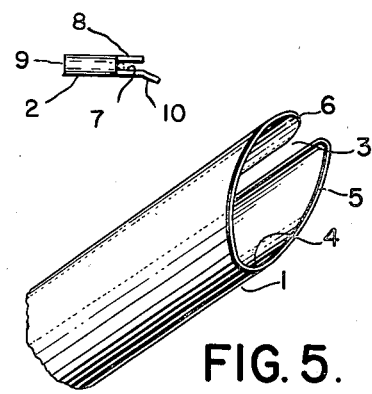
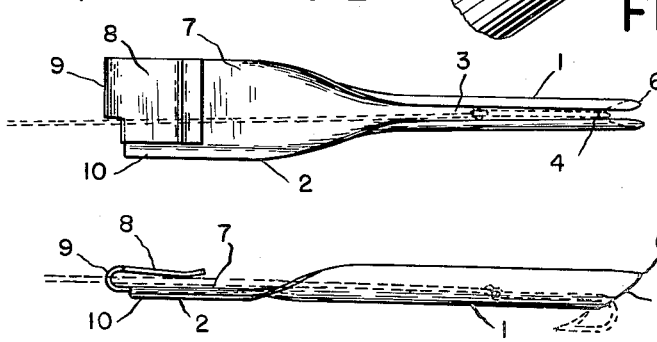
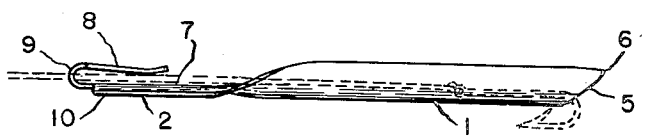
INVENTOR.
PAUL L. KRICHBAUM
BY
ATTORNEYS Patented Feb. 19, 1952

2,586,431

UNITED STATES PATENT OFFICE 2,586,431

FISHHOOK EXTRACTOR

Paul L. Krichbaum, Brighton, Mich.

Application May 26, 1947, Serial No. 750,431

4 Claims. (Cl. 43—53.5)

The invention relates to fishhook extractors for removing hooks from the mouths of fish and has for one of its objects the provision of a simple construction which can be readily applied to a fishline and guided by the fishline and the shank of the hook into engagement with the bend in the hook.

The invention has for another object the provision of an improved fishhook extractor having a tubular portion for receiving the line which has its free end bevelled in a direction to form a notch for readily guiding the extractor to engage the apex of the notch with the bend of the fishhook.

The invention has for a further object to provide an improved fishhook extractor having a grip portion at an end of the tubular portion and comprising parts normally spaced apart to receive the fishline therebetween and movable toward each other to grip the fishline.

These and other objects of the invention will become apparent from the following description taken in connection with the accompanying drawings, in which:

Figure 1 is a perspective view of a fishhook extractor embodying the invention;

Figures 2 and 3 are respectively a side elevation and a plan view of the extractor.

Figure 4 is an end view of the extractor looking at its grip portion.

Figure 5 is a perspective view of the free end portion of the extractor.

The extractor as illustrated in the drawings comprises the tubular portion 1 and the integral grip portion 2 at one end of the tubular portion. The tubular portion has the opening 3 extending throughout its length for the passage of the fishline into the tubular portion, this opening being in the nature of a longitudinally extending slot which is of a width to readily receive the fishline. The tubular portion also has its free end 5 extending from the opening or slot to the side diametrically opposite the opening or slot bevelled and forming a notch 4 with its apex substantially opposite the opening or slot. More particularly, the tubular portion has its free end 5 inclined downwardly, as seen in Figure 3, toward the axis of the tubular portion in a direction away from the opening or slot and generally toward the grip portion forming the notch 4 with its apex spaced from the free end of the opening or slot toward the grip portion, the construction being such that during the insertion of the extractor into the mouth of the fish the engagement of the apex of the notch with the bend of the fishhook is facilitated by the inclined sides of the notch. The side edges at the free end of the opening or slot are flared and more particularly formed with small fillets 6 connecting into the free end of the tubular portion. The fillets facilitate guiding the extractor over the fishline for its passage through the opening or slot by guiding the fishline to the opening or slot.

The grip portion has the generally flat part 7 connecting into the generally tubular portion, the return-bent generally flat part 8 and the resilient return-bend 9 connecting these parts. The parts 7 and 8 are normally spaced from each other a distance to receive the fishline therebetween and the return-bend 9 has a width less than the widths of the parts 7 and 8 with its inner end terminating near the longitudinal center of these parts so that the fishline may readily extend between these parts and past the free end. The part 7 is preferably provided with the inclined flanged edge part 10 to facilitate movement of the fishline between the parts 7 and 8. The fishline is fed between the parts 7 and 8 from the side of the extractor having the inclined flanged edge part 10 so that this part may serve to guide the fishline between the parts.

The construction of the grip portion is such that when the extractor has been inserted into place with the apex of its notch 4 engaging the bend of the fishhook the fishline may be pulled taut and then gripped between the parts 7 and 8 and thereby held taut while removing the fishhook from the mouth of the fish.

While the fishhook extractor may be formed of different material such as sheet metal or a plastic, it is formed in the present instance from a flat sheet metal blank, a portion of which is curled to provide the tubular portion 1 and a portion of which is return-bent to provide the generally flat grip part 8 and the return-bend 9, this metal being sufficiently resilient to normally hold the parts 7 and 8 spaced from each other to receive the fishline there between and to allow them to be moved toward each other to grip the fishline.

What I claim as my invention is:

1. A fishhook extractor comprising a body having a tubular portion and an integral grip portion at one end of said tubular portion, said tubular portion being provided with a longitudinally extending slot for the passage of a line into said tubular portion, and said grip portion being formed of parts normally spaced from each other and a resilient return-bend connecting said parts having a width less than that of said parts for the passage of the line between said parts and beyond an end of said return-bends.

2. A fishhook extractor comprising a body having a grip portion and a tubular portion at one end of said grip portion, said tubular portion having a longitudinally extending slot at one side thereof for the passage of a line into said tubular portion and having a free end inclined to the axis of said tubular portion away from the slot to the side diametrically opposite the slot and also inclined generally toward said grip portion and forming a notch with the apex of the notch diametrically opposite the slot and spaced from the free end of the slot generally toward said grip portion for receiving the bend in the fishhook.

3. A fishhook extractor comprising a grip portion and a tubular portion at one end of said grip portion having an opening extending throughout its length for the passage of a line into said tubular portion, said tubular portion having a free end bevelled from the opening to the side diametrically opposite the opening generally toward said grip portion and forming a notch for receiving the bend in the fishhook with the apex of said notch substantially opposite the slot.

4. A fishhook extractor comprising a tubular portion having an opening extending throughout its length for the passage of a line into said tubular portion and a grip portion at one end of said tubular portion, said grip portion having a generally flat part in connection with said tubular portion adjacent the opening, a second generally flat part normally spaced from said first mentioned part and a resilient return bend connecting said parts, said parts forming a space to receive the line and being movable toward each other to grip the line, and said return bend providing for the movement of said parts toward and away from each other.

PAUL L. KRICHBAUM.

REFERENCES CITED

The following references are of record in the file of this patent:

UNITED STATES PATENTS

| Number | Name | Date |
|---|---|---|
| 379,683 | Coates | Mar. 20, 1888 |
| 1,000,775 | Buras, Jr. | Aug. 15, 1911 |
| 1,047,654 | Klersy | Dec. 17, 1912 |
| 1,905,449 | Dunn | Apr. 25, 1933 |
| 2,164,907 | Falkner | July 4, 1939 |

FOREIGN PATENTS

| Number | Country | Date |
|---|---|---|
| 470,220 | Great Britain | Aug. 11, 1937 |